United States Patent [19]

Pipes

[11] Patent Number: 5,999,997
[45] Date of Patent: *Dec. 7, 1999

[54] TWO COMPUTERS COOPERATING VIA INTERCONNECTED BUSSES

[75] Inventor: Beatrice Dee Pipes, Houston, Tex.

[73] Assignee: Compaq Computer Corporation, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/686,813

[22] Filed: Jul. 26, 1996

[51] Int. Cl.$^6$ .................................................. G06F 17/00
[52] U.S. Cl. ........................ 710/101; 710/102; 710/10; 710/11; 710/16; 714/30; 364/708.01
[58] Field of Search ................................. 395/281, 282, 395/283, 309, 828, 830, 831, 835, 836, 837, 838, 822, 183.07, 183.06, 182.01, 182.08, 182.09, 306, 308, 200.57, 200.79, 200.8; 364/708.01

[56] References Cited

U.S. PATENT DOCUMENTS

| | | | |
|---|---|---|---|
| 4,720,781 | 1/1988 | Crossland et al. | 395/281 |
| 4,823,256 | 4/1989 | Bishop et al. | 395/182.08 |
| 5,297,272 | 3/1994 | Lu et al. | 395/500 |
| 5,574,929 | 11/1996 | Pieterse et al. | 395/800 |
| 5,598,537 | 1/1997 | Swanstrom et al. | 395/281 |
| 5,598,539 | 1/1997 | Gephardt et al. | 395/281 |
| 5,600,800 | 2/1997 | Kikinis et al. | 395/281 |
| 5,625,829 | 4/1997 | Gephardt et al. | 395/800 |
| 5,627,974 | 5/1997 | Watts, Jr. et al. | 395/281 |
| 5,632,020 | 5/1997 | Gephardt et al. | 395/283 |
| 5,642,517 | 6/1997 | Shirota | 395/750 |
| 5,659,680 | 8/1997 | Cunningham et al. | 395/183.01 |
| 5,664,228 | 9/1997 | Mital | 395/882 |
| 5,671,366 | 9/1997 | Niwa et al. | 395/281 |
| 5,745,733 | 4/1998 | Robinson | 395/500 |

OTHER PUBLICATIONS

Compaq Computer Corporation, LTE 5000 Family—Product Details, Jun. 17, 1996, Compaq Online.

Primary Examiner—Ayaz R. Sheikh
Assistant Examiner—Raymond N Phan
Attorney, Agent, or Firm—Sharp, Comfort & Merrett, P.C.

[57] ABSTRACT

A first computer is capable of being used with a second computer. The second computer has a second bus and a second central processing unit that runs a second operating system that provides a user interface. The first computer includes a first bus for connection to the second bus. The first computer also has a first central processing unit configured to run a first operating system that provides a user interface and configured to cooperate sometimes with the second central processing unit such that the first and second computers operate with one of the central processing units as a single computer when the first and second buses are connected.

51 Claims, 9 Drawing Sheets

TWO COMPUTERS COOPERATING VIA INTERCONNECTED BUSSES

BACKGROUND

The invention relates to computer docking.

A docking station may be provided, for example, to receive a portable computer. The docking station may provide additional communication ports, the ability to use a Cathode Ray Tube (CRT) monitor with the portable computer, additional mass storage, and a link to a Local Area Network (LAN) while continuing to make use of the keyboard, microprocessor and other elements of the portable computer.

In a typical LAN or Wide Area Network (WAN), dedicated computers (called servers) furnish network services for other computers (called workstations). A typical server is a file server which furnishes mass storage capabilities for the network. Another typical server is a print server which furnishes printing services for the network. The workstations and servers usually have monitors and keyboards which permit user interaction.

SUMMARY

In general, in one aspect, the invention features a first computer for use with a second computer. The second computer has a second bus and a second central processing unit that runs a second operating system that provides a user interface. The first computer has a first bus for connection to the second bus and a first central processing unit configured to run a first operating system that provides a user interface and configured to cooperate sometimes with the second central processing unit such that the first and second computers operate with one of the central processing units as a single computer when the first and second buses are connected.

Implementations of the invention may include one or more of the following. The second computer may have a peripheral device (e.g., a keyboard, monitor, or mouse) accessible via the second bus, and the cooperation by the first and second computers allows the first computer to access the peripheral device. The cooperation by the first and second computers may include the first computer requesting use of the peripheral device. The first central processing unit may check for system errors at power up of the first computer, and the first computer may not access the peripheral device if system errors are detected by the first central processing unit at power up of the first computer. The first computer may be a desktop computer, a desktop server or a portable computer.

The first computer may have a circuit connected to furnish power to both the first and second computers when the first and second buses are connected. The first computer may have a peripheral device accessible via the first bus, and the cooperation by the first and second computers allows the second computer to access the peripheral.

The cooperation between the first and second computers may include the first computer disabling the first central processing unit. The first computer may disable the first central processing unit prior to the second central processing unit performing diagnostic testing of the first computer. The first computer may perform diagnostic testing of the second computer.

In general, in another aspect, the invention features a method that includes connecting a bus of a first computer having a first central processing unit that runs a first operating system that provides a user interface to a bus of a second computer having a second central processing unit that runs a second operating system that provides a user interface. The method also includes configuring the first and second computers to operate with one of the central processing units as a single computer.

Among the advantages of the invention are one or more of the following. A dedicated keyboard, mouse or display does not have to be purchased for the server. One portable computer may provide a keyboard, monitor, or mouse for any of several servers. The portable computer may also be a workstation when not docked to a server. The portable computer may perform diagnostic testing of the server. Diagnostic testings may be limited to when the portable computer is physically docked to the server, reducing the chance of unauthorized access to the server.

Other advantages and features will become apparent from the description and from the claims.

DETAILED DESCRIPTION

Figure 1:
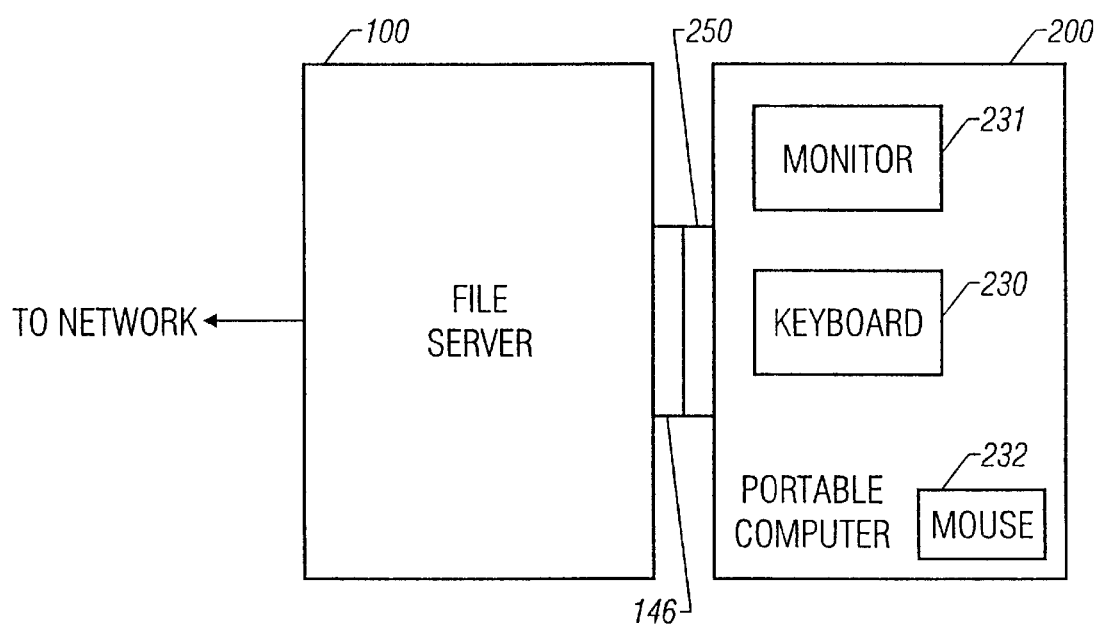
FIG. 1 shows a portable computer docked to a server.

As shown in FIGS. 1A and 1B, unlike a portable computer 200, a file server 100 does not typically require input/output (I/O) devices 230–232 (a monitor 231, a keyboard 230, and a mouse 232) that are typically part of the portable computer 200 because the server 100 normally does its work without the need for direct intervention between the server and the user. In the invention, when I/O devices are needed by the server 100, they can be provided from the portable computer 200 by docking it (mechanically and electrically connecting it) to the server 100. Once docked, the portable computer 200 may operate in a run time mode which permits the server 100 to access and directly use the I/O devices 230–232 as if the I/O devices 230–232 were part of the server 100.

Thus, additional I/O devices do not have to be purchased specifically for the server 100, reducing cost. When not docked to the server 100, the portable computer 200 may be used as a workstation of a Local Area Network (LAN) or a Wide Area Network (WAN) serviced by the server 100 or as a stand-alone portable computer.

When docked, instead of operating in the run time mode, the portable computer 200 may instead operate in a diagnostics mode to perform diagnostic testing of the server 100. The server 100 determines the mode of the portable computer 200 that is docked and instructs the portable computer 200 to operate in the diagnostics mode when system errors (e.g, a faulty device) of the server 100 are detected during a Power On Self Test (POST) routine called SERVER_POST executed by the server 100. Otherwise, the server 100 instructs the portable computer 200 to operate in the run time mode. Once the server 100 is functioning properly, the server 100 may then be rebooted to place the portable computer 200 in the run time mode.

Figure 2A:
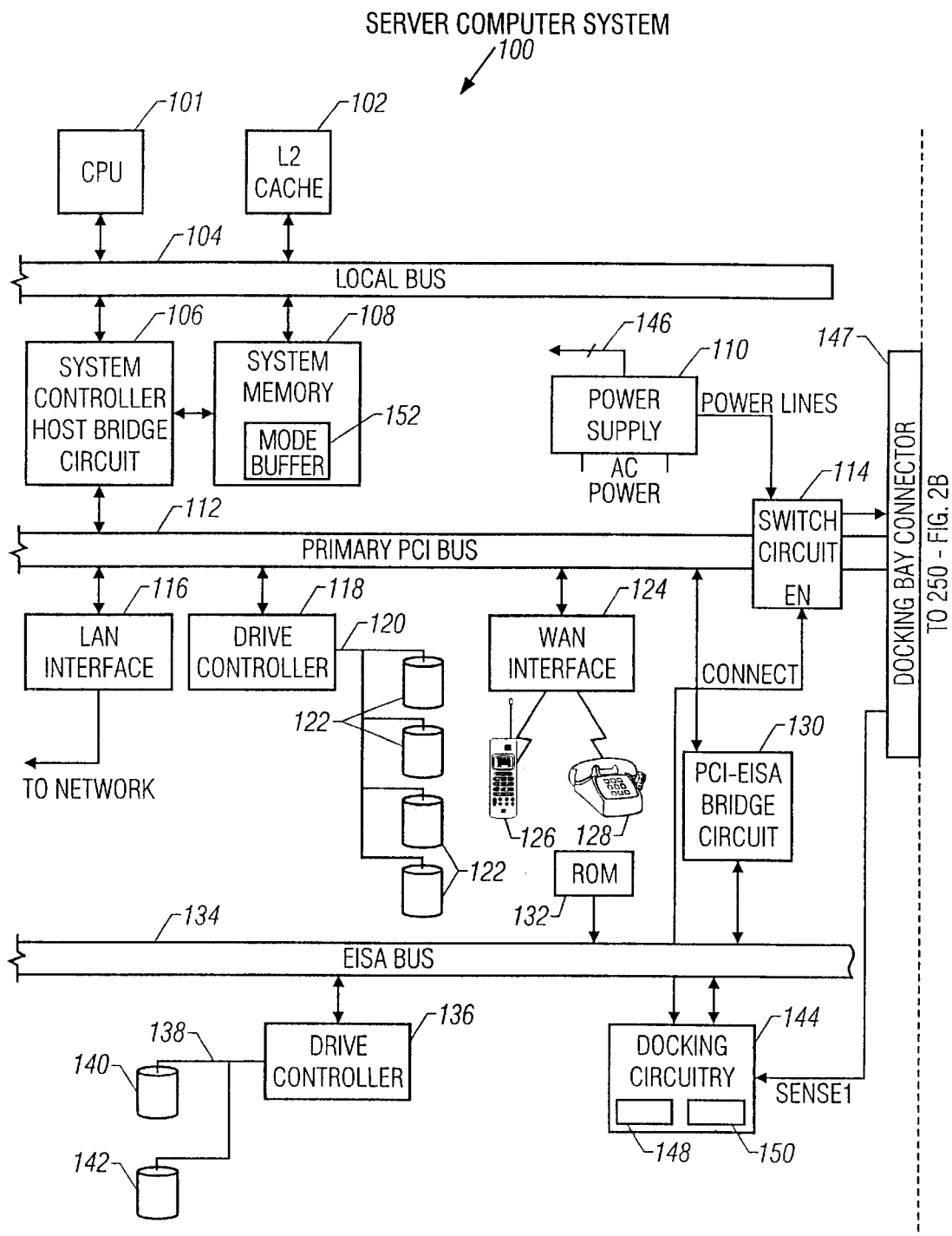
FIGS. 2A and 2B shows a block diagram of a portable computer system docked to a server computer system.
Figure 2B:
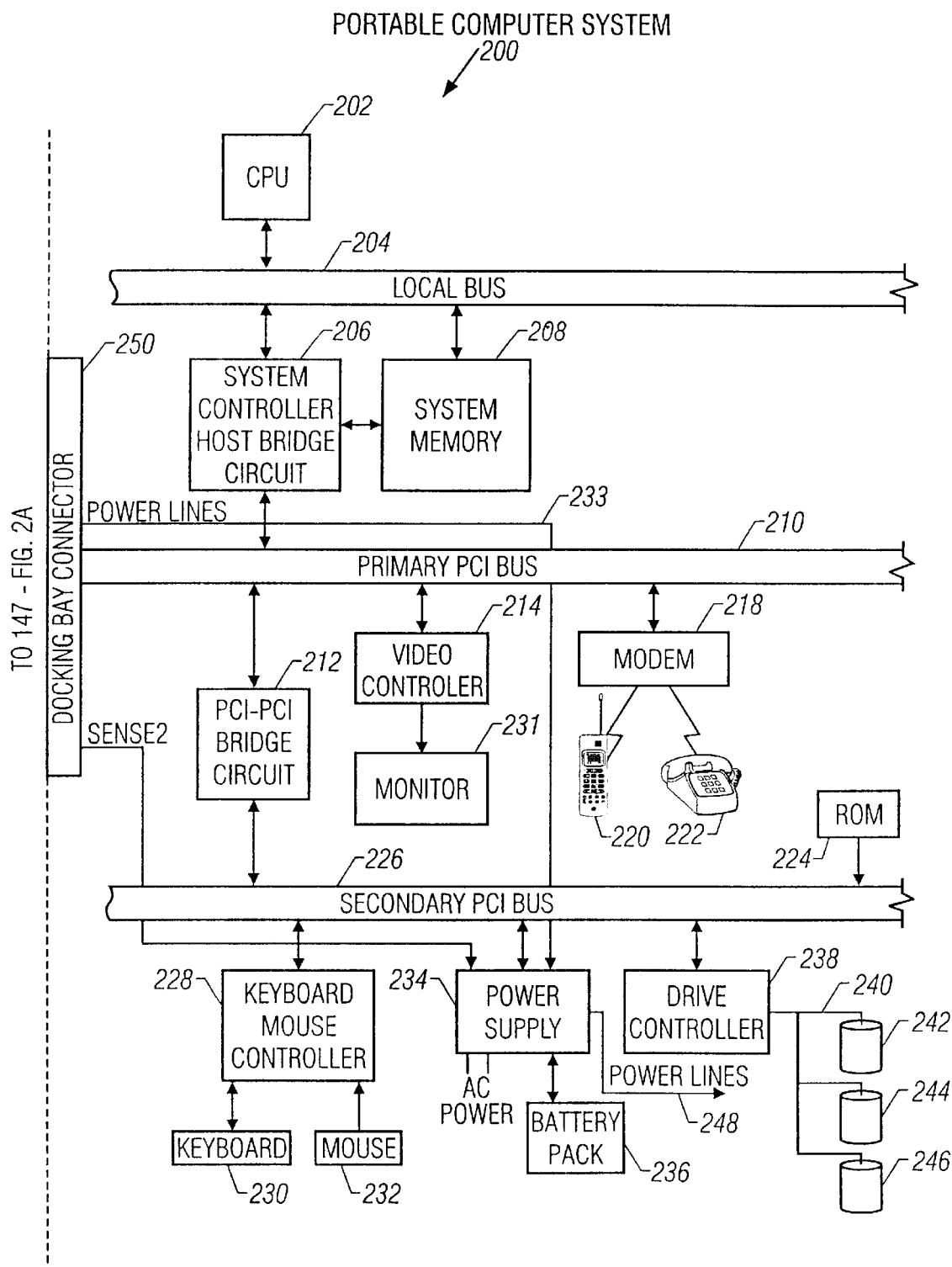

As shown in FIGS. 2A. and 2B, the server 100 has a central processing unit (CPU) 101, a system controller/host bridge circuit 106 and a system memory 108, all of which are coupled to a local bus 104. The CPU 101 runs an operating system that provides an interactive user interface between the server 100 and the rest of the network. The system controller/host bridge circuit 106 controls access to the system memory 108 and interfaces the local bus 104 to a primary Peripheral Component Interconnect (PCI) bus 112. A LAN interface 116, a drive controller 118, and a WAN interface 124 are coupled to the PCI bus 112.

The drive controller 118 controls a Small Computer System Interface (SCSI) bus 120 to which hard disk drives 122 are coupled. The WAN interface 124 furnishes both cellular 126 and telephone line 128 interfaces. The server 100 also has an Extended Industry Standard Architecture (EISA) bus 134. A Read Only Memory (ROM) 132 and a drive controller 136 are coupled to the EISA bus 134. A PCI-EISA bridge circuit 130 interfaces the PCI bus 112 to the EISA bus 134. The drive controller 136 controls a CD ROM drive 140 and a floppy disk drive 142 through a SCSI bus 138.

A power supply 110 receives an AC wall voltage and furnishes power lines 146 for providing power to the server 100 and to the portable computer 200 when the portable computer 200 and the server 100 are docked.

The portable computer 200 has a CPU 202, a system controller/host bridge circuit 206 and a system memory 208, all of which are coupled to a local bus 204. The CPU 202 runs an operating system that provides an interactive user interface. The system controller/host bridge circuit 206 controls access to the system memory 208 and interfaces the local bus 204 to a primary PCI bus 210. A video controller 214 and a modem 218 are coupled to the PCI bus 210. The video controller 214 interfaces the PCI bus 210 to the monitor 231. The modem 218 furnishes both cellular 220 and telephone line 222 interfaces.

The portable computer 200 has secondary PCI bus 226 which is coupled to a ROM 224, a drive controller 238, a keyboard/mouse controller 228 and a power supply 234. The controller 228 interfaces the PCI bus 226 to the keyboard 230 and the mouse 232. A PCI-PCI bridge circuit 212 interfaces the PCI bus 210 to the PCI bus 226. The drive controller 238 controls a CD ROM drive 242, a floppy disk drive 244 and a hard disk drive 246 via a SCSI bus 240. The power supply 234 furnishes power to the portable computer 200 via power lines 248.

The power supply 234 receives its power from one of three sources. When undocked from the server 100, the power supply 234 receives power from either a battery pack 236 or an AC wall voltage if the battery pack 236 is discharged. When docked to the server 100, the power supply 234 receives power from the server 100 via power lines 233, which are coupled to the power supply 110, as described below.

For purposes of mechanically and electrically connecting (i.e., docking) the portable computer 200 and the server 100, the server 100 and portable computer 200 have mating docking bay connectors 147 and 250, respectively, that have contacts used to couple the power lines 233 and 146 together and used to couple the PCI buses 112 and 210 together. Inside the portable computer 200, the PCI bus 210 and the power lines 233 are permanently connected to the docking bay connector 250. However, unlike the portable computer 200, the CPU 101 of the server 100 selectively couples the PCI bus 112 and the power lines 146 to the docking bay connector 147 via a switch circuit 114. Thus, the CPU 101 (i.e., the server 100) determines when the two buses 112 and 210 and the power lines 233 and 146 are electrically coupled and isolated.

In order to know when the two docking bay connectors 147 and 250 are mechanically connected, the CPU 101 monitors a connection indication bit 148 located inside docking circuitry 144. The docking circuitry 144 is coupled to the EISA bus 134 and receives a signal SENSE1 furnished by the docking bay connector 147. When the signal SENSEI is asserted, or driven high, this is an indication that the two connectors 146 and 250 are mechanically connected to each other, and the docking circuitry 144 sets the connection indication bit 148. When the signal SENSE1 is deasserted, or low, this is an indication that the two connectors 147 and 250 are not mechanically connected to each other, and the docking circuitry 144 clears the connection indication bit 148.

For purposes of the CPU 101 disabling and enabling the electrical coupling of the buses 112 and 210 and the power lines 233 and 146, the docking circuitry 144 also includes a connection enable bit 150 that is writable by the CPU 101. A signal CONNECT is furnished by the docking circuitry 144 and received by the enable input of the Quick switch circuit 114. When the CPU 101 writes a "1" to the connection enable bit 150, the signal CONNECT is asserted, or driven high, and the switch circuit 114 electrically connects the two PCI buses 112 and 210 and the power lines 146 and 233. When the CPU 101 writes a "0" (value at power up) to the connection enable bit 150, the signal CONNECT is deasserted, or driven low, and the switch circuit 114 is disabled which isolates the buses 112 and 210 and the power lines 146 and 233. Therefore, when the portable computer 200 and the server 100 are not docked, the bus 112 and the power lines 146 are not exposed at the connector 147.

For purposes of informing the power supply 234 as to the source (i.e., power supply 110, AC wall voltage, or battery pack 236) of its power, the docking bay connector 250 furnishes a signal SENSE2 which is received by the power supply 234. When the signal SENSE2 is asserted, or driven high, the power supply 234 receives power provided via the power lines 233. When the signal SENSE2 is deasserted, or driven low, the power supply 234 receives power from either the AC wall voltage or the battery pack 236.

Figure 3A:
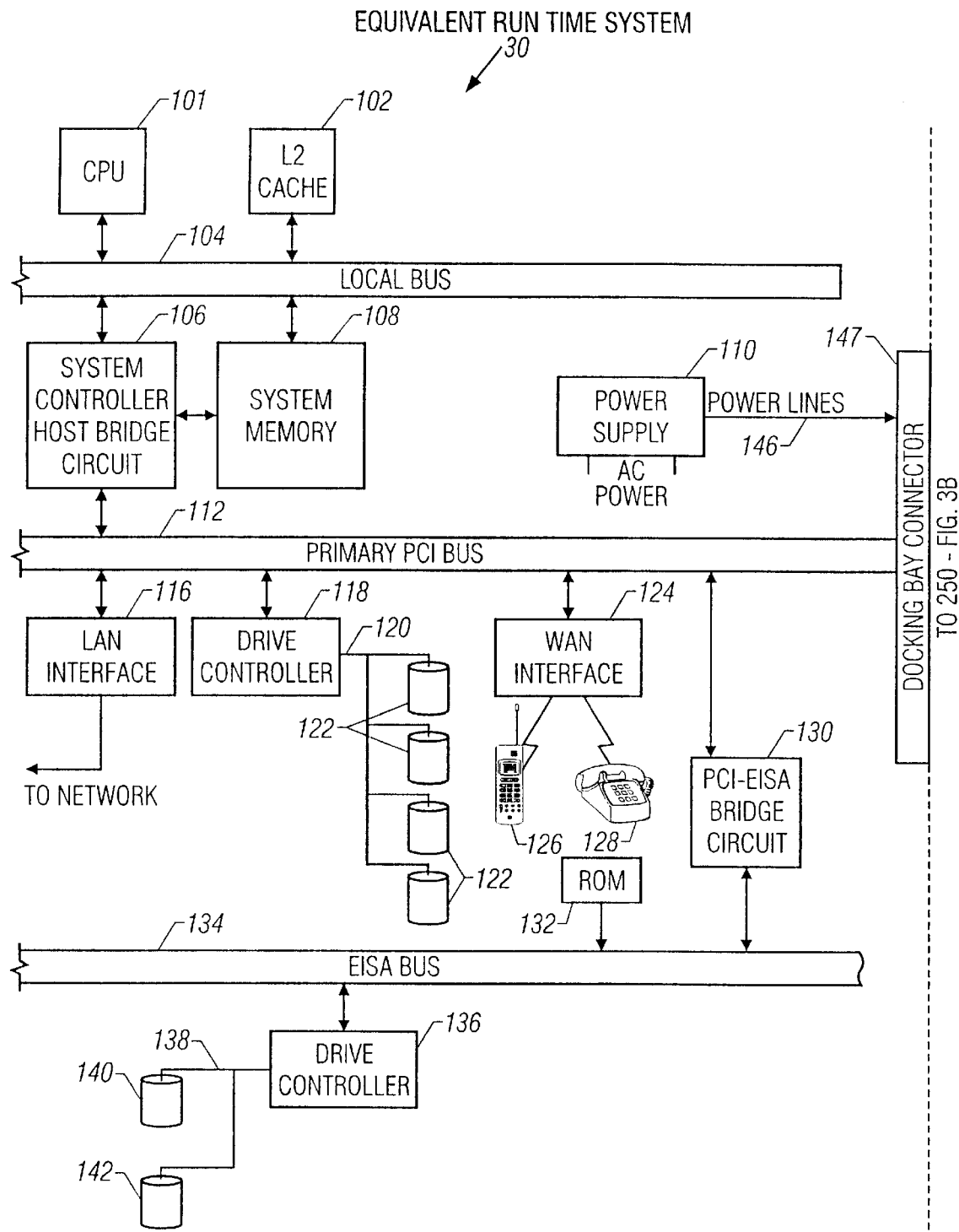
FIGS. 3A and 3B show a block diagram of a portable computer docked to a server and operating in a run time mode.
Figure 3B:
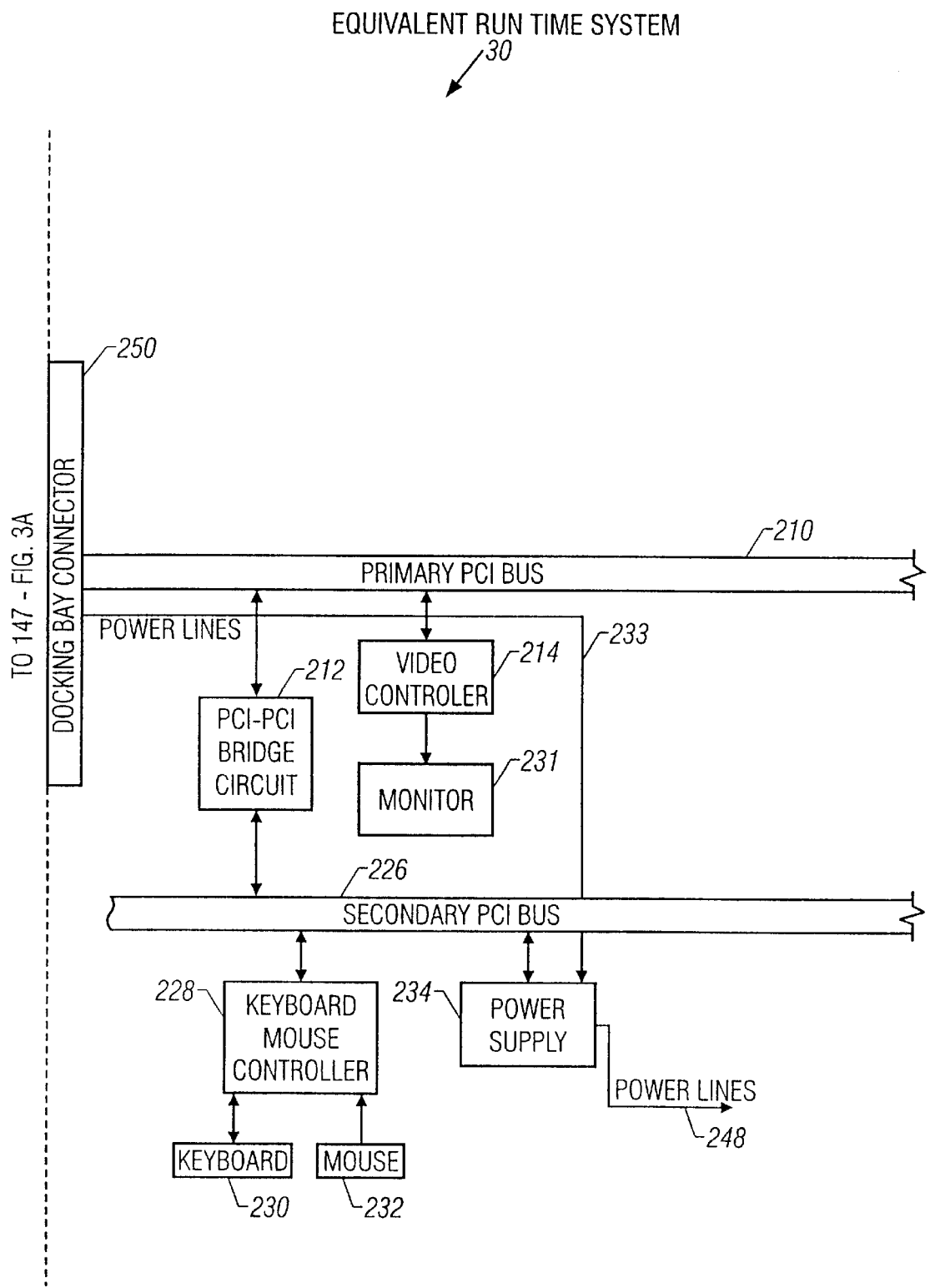
Figure 4A:
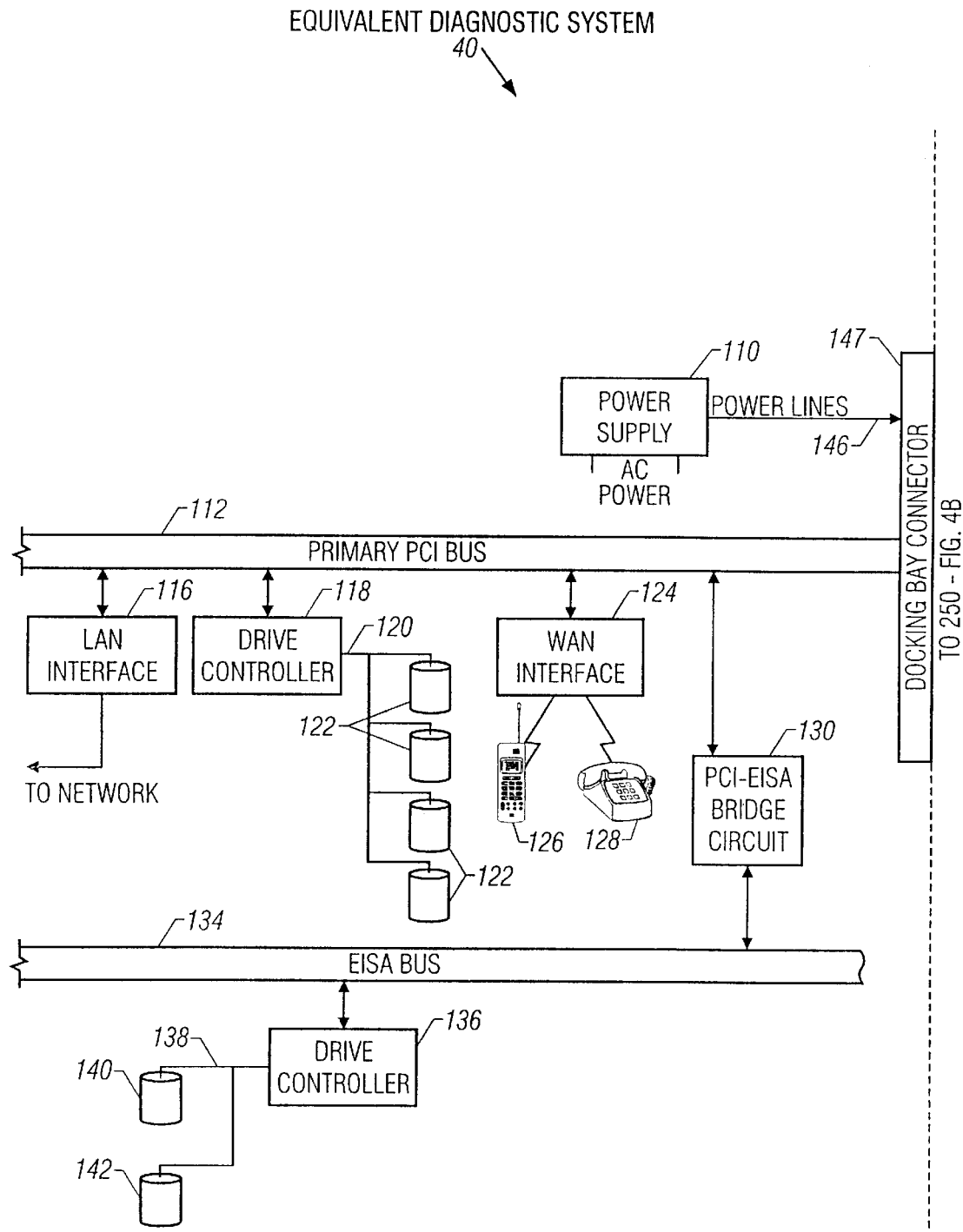
FIGS. 4A and 4B show a block diagram of a portable computer docked to a server and operating in a diagnostic mode.
Figure 4B:
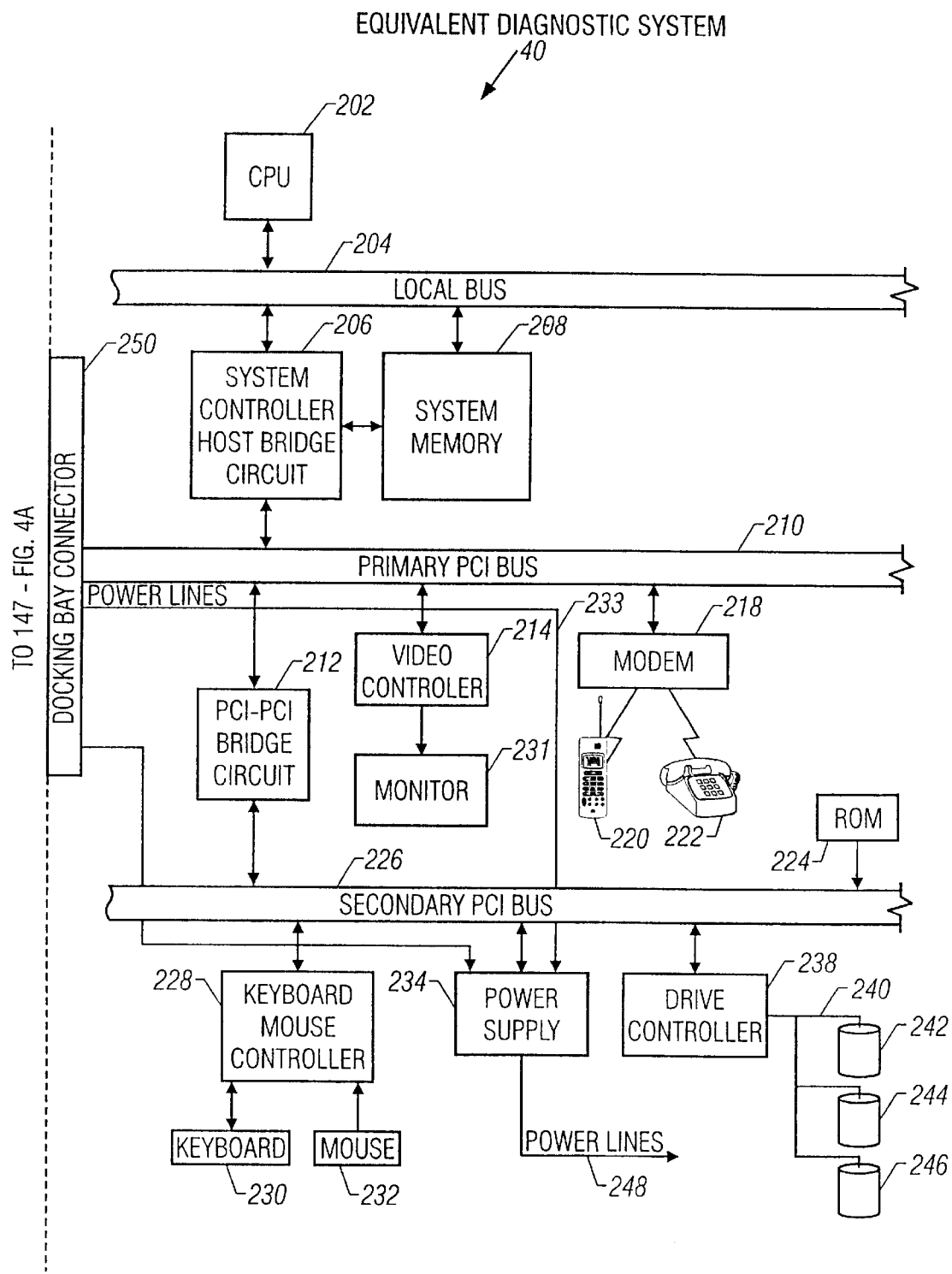

After the server 100 and the portable computer 200 are docked (the docking bay connectors 147 and 250 are mechanically connected, the power lines 233 and 146 are connected, and the buses 110 and 212 are connected), the server 100 and the portable computer 200 are configured as one docked computer system with one memory map. Only one CPU (101 or 202) is enabled to run the docked computer system. If the server 100 selects the run time mode, the docked computer system forms an equivalent run time system 30 (FIGS. 3A and 3B) in which the CPU 202 and the system controller/host bridge circuit 206 are disabled. In the run time system 30, the CPU 101 has access to the I/O devices 230–232 as if the devices 230–232 were part of the server 100. If the server 100 selects the diagnostics mode, an equivalent diagnostics system 40 (FIGS. 4A and 4B) is formed in which the CPU 101 and system controller/host bridge circuit 106 are disabled.

For purposes of communicating the mode determined by the CPU 101 to the CPU 202, a two bit mode buffer 152 (located in the system memory 108) is used as a mailbox. The CPU 101 writes to the mode buffer 152 a value indicative of the mode (run time or diagnostic) and then waits for the CPU 202 to read the buffer 152. The mode buffer 152 has a value of "00" at reset, "01" to indicate the run time mode, "10" to indicate the diagnostics mode, and "11" to indicate the mode buffer 152 has been read by the CPU 202.

Figure 5:
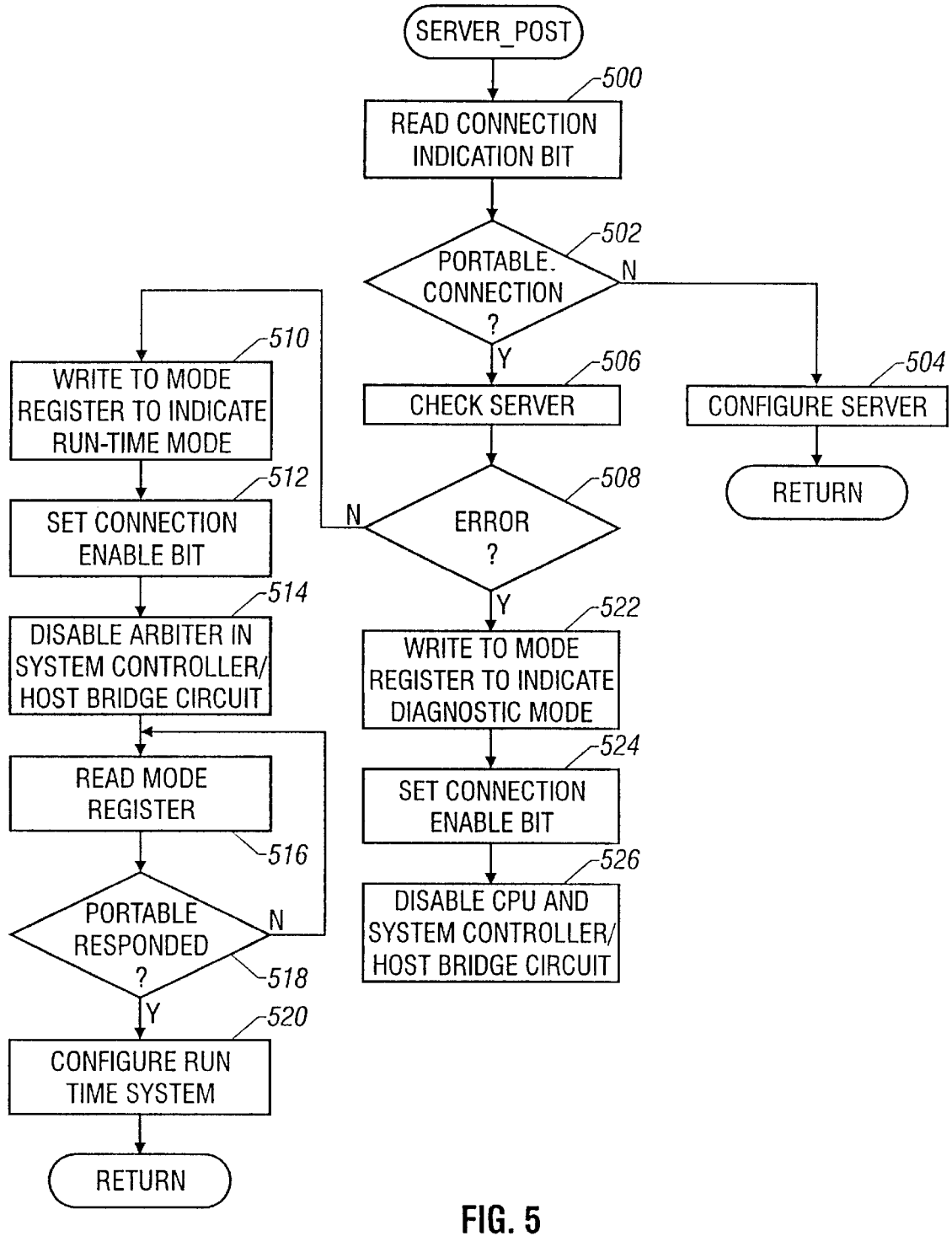
FIG. 5 shows a server power on self test (POST) process.

When first powered up, the CPU 101 executes the SERVER_POST routine (located in the ROM 132). As shown in FIG. 5, the CPU 101 reads 500 the connection indication bit 148 to determine 502 if the connectors 146 and 250 are mechanically connected. If not, the CPU 101 configures 504 the server 100.

If the two connectors 146 and 250 are connected, the CPU 101 checks 506 the system 100 using conventional POST testing procedures. If the CPU 101 determines 508 that a system error has occurred, the CPU writes 522 the value "10" to the mode buffer 152 to indicate the diagnostics mode. The CPU 101 then sets 524 the connection enable bit 150 and disables 526 the system controller/host bridge circuit 106 and the CPU 101.

If a system error did not occur, the CPU 101 writes 510 the value "01" to the mode buffer 152 to indicate the run time mode. The CPU 101 then sets 512 the connection enable bit 150 and disables 514 the arbiter inside the system controller/host bridge circuit 106. The CPU 101 then polls 516–518 the mode buffer 152 until the CPU 202 acknowledges the run time mode by writing the value "11" to the mode buffer 152. The CPU 101 then configures. 520 the run time system 30 and returns from the SERVER_POST routine.

Figure 6:
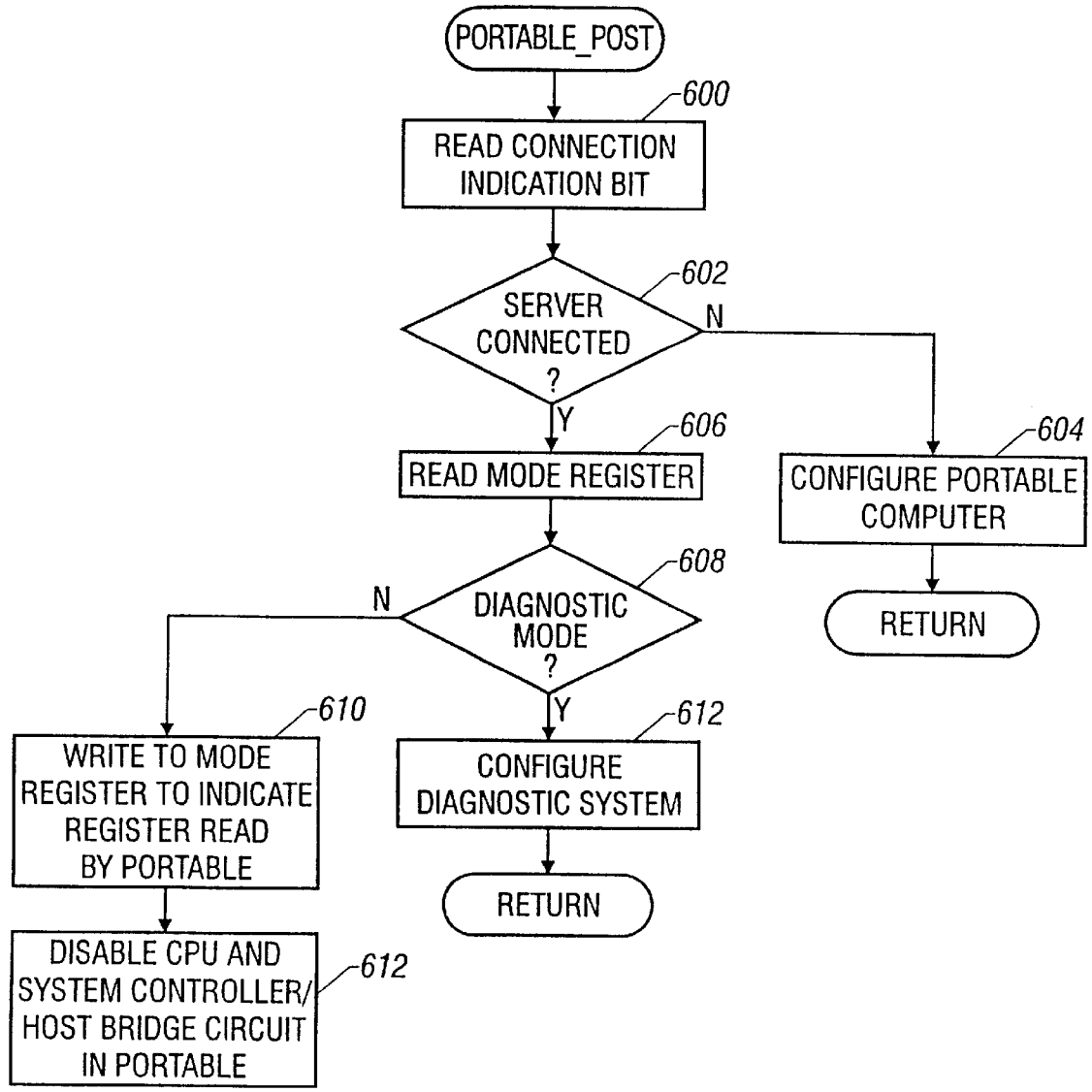
FIG. 6 shows a portable computer POST process.

When the CPU 202 is first powered up, the CPU 202 executes a POST routine (located in the ROM 224) called PORTABLE_POST (FIG. 6). The CPU 202 reads 600 the connection indication bit 148 and determines 602 whether the server 100 and the portable computer 200 are docked. If not, the CPU 202 configures 604 the portable computer 200.

If the server 100 and the portable computer 200 are docked, the CPU 202 reads 606 the mode buffer 152 and determines 608 whether the portable computer 200 should be in the diagnostics mode 608. If so, the CPU 202 configures 612 the diagnostic system 40 and returns from the PORTABLE_POST routine. Otherwise, the CPU 202 writes to the mode buffer 152 to acknowledge reading the mode buffer 132 and disables 612 the system/controller host bridge circuit 206 and the CPU 202.

Other embodiments are within the scope of the following claims.

What is claimed is:

1. A first computer for use with a second computer, the second computer having a second bus and a second central processing unit that runs a second operating system that provides a user interface, the first computer comprising:
   a first bus for connection to the second bus; and
   a first central processing unit configured to run a first operating system that provides a user interface and configured to cooperate with the second central processing unit such that the first and second computers operate in at least first and second alternative modes when the first and second buses are connected, the first mode using the first central processing unit and the second mode using only the second central processing unit.

2. The first computer of claim 1 wherein the second computer has a peripheral device accessible via the second bus, and the cooperation by the first and second computers allows the first computer to access the peripheral device.

3. The first computer of claim 2 wherein the cooperation by the first and second computers includes the first computer requesting use of the peripheral device.

4. The first computer of claim 2,
   wherein the first central processing unit checks for system errors at power up of the first computer and,
   wherein the first computer does not access the peripheral device if system errors are detected by the first central processing unit computer.

5. The first computer of claim 2 wherein the peripheral device comprises at least one of a keyboard, a display and a mouse.

6. The first computer of claim 1 further comprising a circuit connected to furnish power to both the first and second computers when the first and second buses are connected.

7. The first computer of claim 1 further comprising:
   a peripheral device accessible via the first bus; and
   the cooperation by the first and second computers allows the second computer to access the peripheral.

8. The first computer of claim 7 wherein the cooperation by the first and second computers includes disabling the first central processing unit.

9. The first computer of claim 7 wherein the cooperation by the first and second computers includes the second computer requesting use of the peripheral.

10. The first computer of claim 7,
    wherein the first central processing unit checks for system errors at power up of the first computer, and
    wherein the second computer does not access the peripheral if system errors are detected by the second central processing unit at power up of the second computer.

11. The first computer of claim 7 wherein the peripheral device comprises at least one of a keyboard, a mouse and a monitor.

12. The first computer of claim 1 wherein the cooperation between the first and second computers includes:
    the first computer disabling the first central processing unit.

13. The first computer of claim 1 wherein the first computer performs diagnostic testing of the second computer.

14. The first computer of claim 13 wherein the cooperation by the first and second computer includes the second computer requesting the diagnostic testing.

15. The first computer of claim 1 wherein the first computer comprises a portable computer.

16. The first computer of claim 1 wherein the first computer comprises a desktop computer.

17. The first computer of claim 1 wherein the first computer comprises a server for a network.

18. A method comprising:
    providing a first computer having a first central processing unit that runs a first operating system;
    providing a second computer having a second central processing unit that runs a second operating system that provides a user interface;
    connecting a bus of the first computer to a bus of the second computer; and
    at a first time, operating the first and second computers in a first mode using the first central processing unit but not the second central processing unit; and
    at a second time, operating the first and second computers in a second mode using the second central processing unit but not the first central processing unit.

19. The method of claim 18 wherein the configuring allows the first computer to access a peripheral device of the second computer.

20. The method of claim 19 wherein the configuring includes disabling the second central processing unit.

21. The method of claim 19 wherein the configuring includes the first computer requesting access to the peripheral device.

22. The method of claim 19 wherein the configuring includes the first computer not accessing the peripheral device if system errors are detected by the first central processing unit at power up of the first computer.

23. The method of claim 19 wherein the peripheral device comprises at least one of a keyboard, a mouse and a monitor.

24. The method of claim 18 wherein the configuring includes disabling the first central processing unit.

25. The method of claim 24 wherein the disabling occurs prior to the second central processing unit performing diagnostic testing of the first computer.

26. The method of claim 24,
further comprising the first computer checking for system errors in the first computer at power up of the first computer, and
wherein the disabling occurs if the first computer does not detect system errors at power up of the first computer.

27. The method of claim 18 wherein the configuring allows the second computer to perform diagnostic testing of the first computer.

28. The method of claim 27 wherein the configuring includes the first computer requesting the diagnostic testing.

29. A computer system comprising:
a second computer having:
a second bus,
a peripheral device accessible via the second bus, and
a second central processing unit that runs a second operating system that provides a user interface; and
a first computer having:
a first bus for connection to the second bus, and
a first central processing unit configured to run a first operating system and configured to cooperate with the second central processing unit;
wherein the first and second computers are configured to operate in at least two alternative modes when the first bus is coupled to the second bus, one of the alternative modes using the first central processing unit but not the second central processing unit and the other of the two alternative modes using the second central processing unit but not the first central processing unit.

30. The computer system of claim 29, wherein the first computer comprises a server and the second computer comprises a portable computer.

31. The first computer of claim 1 wherein the first central processing unit is disabled in the second mode.

32. The first computer of claim 1 wherein the second central processing unit is disabled in the first mode.

33. The first computer of claim 7 wherein the cooperation by the first and second computers includes disabling the second central processing unit.

34. A first computer for use with a second computer, the second computer having a second bus and a second central processing unit that runs a second operating system that provides a user interface, the first computer comprising:
a first bus for connection to the second bus; and
a first central processing unit configured to run a first operating system that provides a user interface and configured to cooperate with the second central processing unit such that the first and second computers operate in a diagnostic mode and a run time mode when the first and second buses are connected, the first and second computers using the first central processing unit in the run time mode and using only the second central processing unit in the diagnostic mode.

35. A computer system comprising:
a central processing unit;
a user input device coupled for access by the central processing unit;
a user output device coupled for access by the central processing unit; and
a memory storing a plurality of program instructions, the program instructions being executed by the central processing unit and comprising:
a set of computer instructions for determining if the computer system is coupled to a second computer system that includes a second central processing unit, a system memory and a plurality of devices;
a set of computer instructions for determining whether the computer system is to run in a diagnostic mode if the computer system is coupled to the second computer system;
a set of computer instructions for configuring the system in a diagnostic mode if it is determined that the computer system is to run in a diagnostic mode; and
a set of computer instructions to enable the second central processing unit to access the user input device and the user output device if it is not determined that the computer system is to run in a diagnostic mode.

36. The system of claim 35 wherein the set of computer instructions to enable the second central processing unit to access the user input device and the user output device includes instructions to disable the central processing unit.

37. The system of claim 36 wherein the instructions to disable the central processing unit include instructions to disable a bridge circuit in the computer system.

38. The system of claim 35 and further comprising a set of computer instructions for diagnosing a failure in the second computer system when the computer system has been configured to operate in a diagnostic mode.

39. The system of claim 35 wherein the set of computer instructions for determining whether the computer system is to run in a diagnostic mode comprises instructions for checking a memory storage unit.

40. The system of claim 39 and further comprising a set of computer instructions for writing to the memory storage unit after the memory storage unit has been checked.

41. The system of claim 35 wherein the computer system comprises a portable computer.

42. The system of claim 41 wherein the second computer system comprises a network server.

43. A computer system comprising:
a processor;
system memory coupled for access by the processor;
a plurality of devices coupled for access by the processor;
a memory storing a plurality of program instructions, the program instructions being executed by the processor and comprising computer instructions for:
testing the system memory and the plurality of devices;
if errors are found during the testing, writing a message to a memory storage unit to indicate to a portable computer that the computer system is entering a diagnostic mode; and
disabling the processor so that the portable computer can be coupled to diagnose a cause of the errors found during testing.

44. The system of claim 43 wherein the program instructions further comprise computer instructions for:
- determining whether the computer system is coupled to the portable computer;
- if the computer system is coupled to the portable computer and no errors are found during the testing, writing a message to the portable computer indicating that the computer system intends to utilize a user interface device of the portable computer; and
- accessing the user interface device by the central processing unit.

45. The system of claim 44 wherein the user interface device comprises at least one of a keyboard, a mouse and a display.

46. The system of claim 43 wherein the computer system comprises a network server.

47. The system of claim 43 wherein the computer system comprises a desktop computer.

48. A computer system comprising:
- a processor;
- system memory coupled for access by the processor;
- a plurality of devices coupled for access by the processor;
- a memory storing a plurality of program instructions, the program instructions being executed by the processor and comprising computer instructions for:
  - determining whether the computer system is coupled to a second computer system;
  - if the computer system is coupled to a second computer system, writing a message to the second computer system indicating that the computer system intends to utilize a user interface device of the second computer system;
  - determining whether the second computer system has acknowledged the message indicating that the computer system intends to utilize a user interface device of the second computer system; and
  - after receiving an acknowledgment from the second computer, accessing the user interface device by the central processing unit.

49. The system of claim 48 wherein the program instructions further comprise instructions for testing the computer system.

50. The system of claim 49 wherein the program instructions further comprise instructions for:
- writing a message to a memory storage unit to indicate to a second computer system that the computer system is entering a diagnostic mode if errors are found during the testing; and
- disabling the processor so that the second computer system can be coupled to diagnose a cause of the errors found during testing.

51. The system of claim 50 wherein the second computer system comprises a portable computer.

* * * * *